United States Patent [19]

Brekner et al.

[11] Patent Number: 5,428,098
[45] Date of Patent: Jun. 27, 1995

[54] FIBER-REINFORCED CYCLOOLEFIN COPOLYMER MATERIAL, PROCESS FOR ITS PREPARATION AND SHAPED ARTICLES FROM THE MATERIAL

[75] Inventors: Michael-Joachim Brekner; Horst-Tore Land, both of Frankfurt am Main; Frank Osan, Kelkheim/Taunus, all of Germany

[73] Assignee: Hoechst Aktiengesellschaft, Frankfurt am Main, Germany

[21] Appl. No.: 187,224

[22] Filed: Jan. 27, 1994

[30] Foreign Application Priority Data

Jan. 29, 1993 [DE] Germany ............... 43 02 569.2

[51] Int. Cl.⁶ ............... C08K 3/40; C08K 3/04; C08F 4/44; C08F 36/00
[52] U.S. Cl. ............... 524/494; 524/401; 524/439; 524/492; 524/495; 526/127; 526/132; 526/160; 526/280; 526/282; 526/283
[58] Field of Search ............... 524/401, 439, 492, 494, 524/495; 523/205, 217; 526/280, 281, 282, 127, 132, 160, 189, 283

[56] References Cited

U.S. PATENT DOCUMENTS

| | | | |
|---|---|---|---|
| 3,624,143 | 11/1971 | Shen et al. | 564/162 |
| 4,534,874 | 8/1985 | Steinberg et al. | 564/162 |
| 4,808,572 | 2/1989 | Beck et al. | 564/154 |
| 5,019,620 | 5/1991 | Endo et al. | 526/281 |
| 5,063,103 | 11/1991 | Sugawara et al. | 523/207 |
| 5,187,012 | 2/1993 | Takarashi et al. | 526/282 |
| 5,204,427 | 4/1993 | Torii | 526/281 |

FOREIGN PATENT DOCUMENTS

2040041 10/1991 Canada.
2407951 6/1979 France.

OTHER PUBLICATIONS

Koinzer et al., Chemical Abstracts, vol. 91, 1979, p. 40, abstract 91:6000a.

*Primary Examiner*—Tae H. Yoon
*Attorney, Agent, or Firm*—Curtis, Morris & Safford

[57] ABSTRACT

A fiber-reinforced cycloolefin polymer material comprises 1 to 99% by weight of reinforcing fibers, in particular glass fibers, and 99 to 1% by weight of a cycloolefin copolymer which is built up from a) at least one (polycyclo)olefin which is derived from norbornene, for example tetracyclododecene, and b) at least one olefin which is chosen from monocycloolefins having 4 to 12 C atoms (VII) and/or the group of acyclic olefins VIII

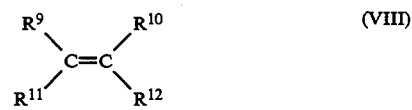

in which $R^9$, $R^{10}$, $R^{11}$ and $R^{12}$ are identical or different and are a hydrogen atom or a $C_1$–$C_8$-alkyl radical. VII is preferably ethylene. The monomer units of the (polycyclo)olefin in the cycloolefin copolymer molecule are in each case separated by monomer units of the cyclic olefins VII and/or of the acyclic olefins of the formula VIII.

16 Claims, No Drawings

FIBER-REINFORCED CYCLOOLEFIN COPOLYMER MATERIAL, PROCESS FOR ITS PREPARATION AND SHAPED ARTICLES FROM THE MATERIAL

The present invention relates to "chemically uniform" cycloolefin copolymers which comprise as monomers at least one polycycloolefin, such as, for example, norbornene, and at least one monocycloolefin and/or one acyclic olefin, and are reinforced by fibers, in particular glass fibers.

Cycloolefin copolymers are a class of polymer having an outstanding level of properties. They are distinguished, inter alia, by a high heat distortion point, hydrolytic stability, a low absorption of water, resistance to weathering and a high rigidity.

It is known that cycloolefins can be polymerized by means of various catalysts. The polymerization here proceeds via ring opening (U.S. Pat. No. 3,557,072) or with opening of the double bond (EP 156464, U.S. Pat. No. 5,087,677), depending on the catalyst.

It is known that reinforcing substances can be incorporated into cycloolefin copolymers. JP 3207739, DD 203059 and EP 451858 thus report thermoplastic combinations which comprise random polymers of cycloolefins and ethylene or polycycloolefins and ethylene. Such thermoplastic combinations are distinguished, for example, by a particularly high rigidity. However, these materials have the decided disadvantage that, because of their amorphous character, they have to be processed at a temperature of at least 170° C. above the glass transition temperature. Since thermal stability of the cycloolefin polymers is guaranteed only up to 350° C., heat distortion points of only up to a maximum of 180° C. can be established with the mixtures described in JP 3207739, DD 203059 and EP 451858.

The aim of the development of polymeric materials is always to establish a maximum heat distortion point. The object was therefore to provide fiber-reinforced materials, based on cycloolefin polymers, which have a heat distortion point of at least 180° C. and a good thermoplastic processability. This object is achieved by the present invention.

A fiber-reinforced cycloolefin copolymer material has now been found which comprises 1 to 99% by weight of reinforcing fibers and 99-1% by weight of at least one cycloolefin copolymer which is built up from at least one polycycloolefin of the formulae I to VI

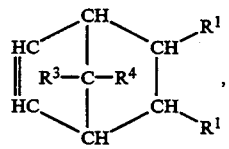
(I)

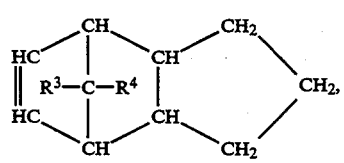
(II)

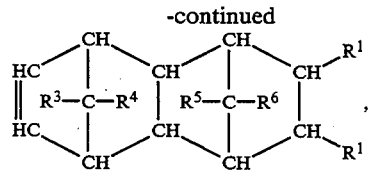
(III)

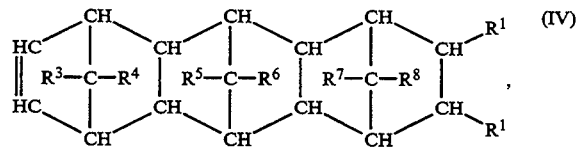
(IV)

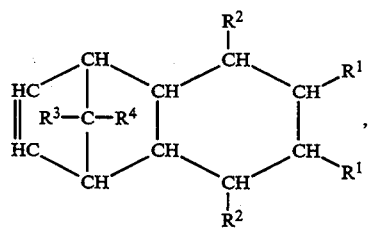
(V)

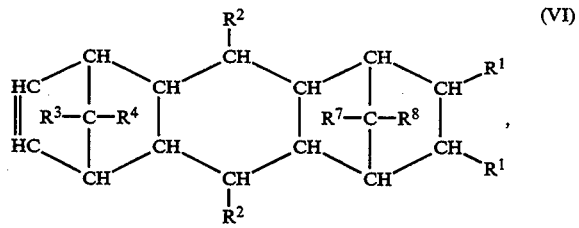
(VI)

in which $R^1$, $R^2$, $R^3$, $R^4$, $R^5$, $R^6$, $R^7$ and $R^8$ are identical or different and are a hydrogen atom or a $C_6$–$C_{16}$-aryl or a $C_1$–$C_8$-radical, and at least one olefin which is chosen from the group of monocycloolefins of the formula VII

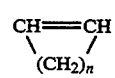
(VII)

in which n is a number from 2 to 10, and/or the group of acyclic olefins of the formula VIII

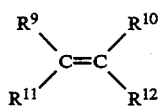
(VIII)

in which $R^9$, $R^{10}$, $R^{11}$ and $R^{12}$ are identical or different and are a hydrogen atom or a $C_1$–$C_8$-alkyl radical. The cycloolefin polymer material is distinguished in that the polycycloolefins of the formulae I to VI, the monocycloolefins of the formula VII and/or the acyclic olefins of the formula VIII are not randomly distributed in the polymer molecule, but two polycycloolefin units are not immediately adjacent, but are in each case separated by at least one unit VII and/or VIII. The monomer VIII should preferably always be present and the monomer VII can additionally be present.

Preferably, in each case only one unit VII or VIII, in particular exclusively VIII, is positioned between two polycycloolefin units. Polymers having the regular arrangement of the monomers described above are called "chemically uniform" below, this term in part being used more narrowly here than in EP 0 503 422.

If the fiber-reinforced cycloolefin copolymer material comprises a plurality of cycloolefin copolymers, each of the copolymers is "chemically uniform". The preparation of chemically uniformcycloolefin copolymers is described in European Patent Application EP 0 503 422, which is expressly referred to here.

The preparation of a "chemically uniform" cycloolefin copolymer is carried out in accordance with EP 0 503 422 by polymerization of 0.1 to 99.9% by weight, based on the total amount of monomers, of at least one monomer of the formulae I, II, III, IV, V or VI

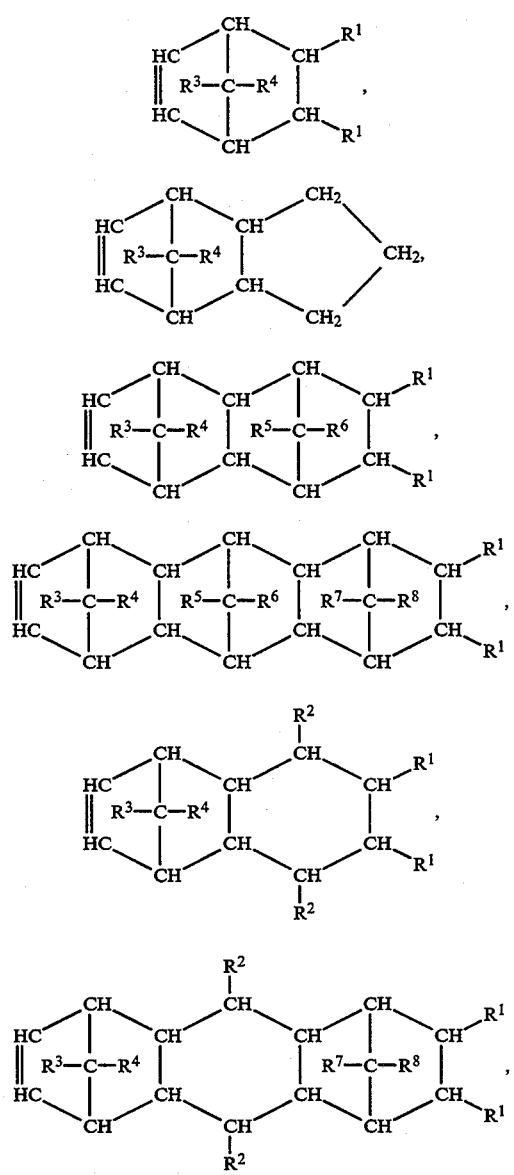

in which $R^1$, $R^2$, $R^3$, $R^4$, $R^5$, $R^6$, $R^7$ and $R^8$ are identical or different and are a hydrogen atom or a $C_6$–$C_{16}$-aryl or a $C_1$–$C_8$-alkyl radical, it being possible for the same radicals in the various formulae to have a different meaning, 0 to 99.9% by weight, based on the total amount of monomers, of a cycloolefin of the formula VII

in which n is a number from 2 to 10, and 0 to 99.9% by weight, based on the total amount of monomers, of at least one acyclic olefin of the formula VIII

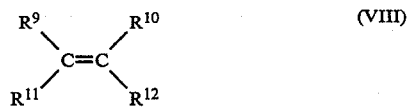

in which $R^9$, $R^{10}$, $R^{11}$ and $R^{12}$ are identical or different and are a hydrogen atom or a $C_1$–$C_8$-alkyl radical, at temperatures of $-78°$ to $150°$ C. under a pressure of 0.01 to 64 bar in the presence of a catalyst which comprises an aluminoxane of the formula IX

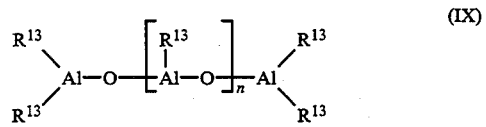

(=linear type) and/or of the formula X

(=cyclic type), in which, in the formulae IX and X the radicals $R^{13}$ are identical or different and are a $C_1$–$C_6$-alkyl group or phenyl or benzyl and n is an integer from 0 to 50, and a metallocene of the formula XI

in which
$M^1$ is titanium, zirconium, hafnium, vanadium, niobium or tantalum,
$R^{14}$ and $R^{15}$ are identical or different and are a hydrogen atom, a halogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group or a $C_8$–$C_{40}$-arylalkenyl group,
$R^{16}$ and $R^{17}$ are identical or different and are a mono- or polynuclear hydrocarbon radical which can form a sandwich structure with the central atom $M^1$,
$R^{18}$ is

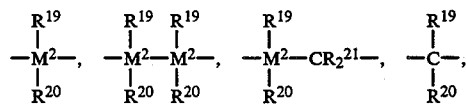

-continued

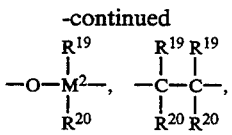

$=BR^{19}$, $=AlR^{19}$, $-Ge-$, $-Sn-$, $-O-$, $-S-$, $=SO$, $=SO_2$, $=NR^{19}$, $=CO$, $=PR^{19}$ or $=P(O)R^{19}$, in which $R^{19}$, $R^{20}$ and $R^{21}$ are identical or different and are a hydrogen atom, a halogen atom, a $C_1-C_{10}$-alkyl group, a $C_1-C_{10}$-fluoroalkyl group, a $C_6-C_{10}$-fluoroaryl group, a $C_6-C_{10}$-aryl group, a $C_1-C_{10}$-alkoxy group, a $C_2-C_{10}$-alkenyl group, a $C_7-C_{40}$-arylalkyl group, a $C_8-C_{40}$-arylalkenyl group or a $C_7-C_{40}$-alkylaryl group, or $R^{19}$ and $R^{20}$ and $R^{21}$, in each case with the atoms joining them, form a ring, and $M^2$ is silicon, germanium or tin. The part of the metallocene molecule here formed by $M^1$ and the substituents $R^{16}-R^{17}$ displays $C_1$-symmetry or, if $R^{16}$ and $R^{17}$ are identical, is in the meso-form.

The term alkyl here is straight-chain or branched alkyl.

The monocyclic olefin VII can also be substituted (for example by aryl or alkyl radicals).

The polymerization is preferably carried out in liquid polycycloolefin I-VI, in mixtures of polycycloolefin or in concentrated solutions.

In the process for the preparation of "chemically uniform" cycloolefin copolymers which are suitable for the preparation of the fiber-reinforced materials according to the invention, at least one polycyclic olefin of the formulae I, II, III, IV, V or VI, preferably one cycloolefin of the formula I or III, is polymerized.

The second comonomer here is preferably an acyclic olefin of the formula VIII, in which $R^9$, $R^{10}$, $R^{11}$ and $R^{12}$ are identical or different and are a hydrogen atom or a $C_1-C_8$-alkyl radical. Ethylene or propylene are preferred. If appropriate, a monocyclic olefin of the formula VII, in which n is a number from 2 to 10 is also additionally used.

In particular, copolymers of polycyclic olefins, preferably of the formulae I and III, with the acyclic olefins VIII are prepared.

Particularly preferred cycloolefins are norbornene and tetracyclododecene, it being possible for these to be substituted via ($C_1-C_6$)-alkyl. They are preferably copolymerized with ethylene; ethylene/norbornene copolymers are of particular importance.

Polycyclic olefins, monocyclic olefins and open-chain olefins are also to be understood as meaning mixtures of two or more olefins of the particular type. This means that, in addition to polycyclic bicopolymers, ter- and multicopolymers can also be prepared.

The fiber-reinforced materials according to the invention are particularly suitable for the production of extruded components, such as sheets, tubes, pipes, rods and fibers, and also for the production of injection molded articles of any shape and size.

The particular advantage of the chemically uniform cycloolefin copolymers is their particularly simple ease of preparation and their particularly pronounced stability to non-polar solvents. The advantageous properties known of other random cycloolefin copolymers, such as hydrolytic stability, low absorption of water and resistance to weathering, however, are retained.

The degree of crystallinity of chemically uniform cycloolefin copolymers is between 0.1 and 50%, preferably between 2 and 40%.

This can be determined by the radiography method known from the literature (cf. K. Kakudo, N, Kasai, X-Ray Diffraction by Polymers, Elsevier, Amsterdam 1972).

Preferably, the fiber-reinforced cycloolefin copolymer comprises a single polycycloolefin of the formulae I to VI and either at least one monocycloolefin of the formula VII or at least one acyclic olefin of the formula VIII. Blocks of polycycloolefin are absent in the polymer molecule. In the limiting case, the polycycloolefin and the olefin VII and/or VIII are arranged regularly and alternately in the polymer molecule.

It is particularly preferable if a 1-olefin, such as ethylene, propylene or but-1-ene, is used as the acyclic olefin of the formula VIII. It is particularly preferable if the copolymer comprises equimolar amounts of norbornene and ethylene and the two monomer molecules are arranged regularly and alternately in the polymer.

The fibers used for the reinforcement can be of carbon, metal, ceramic or aramid. Materials of high strength which are impermeable to light can be produced in this manner. For economic reasons, it is advantageous to use glass fibers for the reinforcement. If the cycloolefin copolymer employed is transparent and the refractive indices of the copolymer and glass fiber coincide, a transparent fiber-reinforced cycloolefin polymer material can be obtained. If the difference in the refractive indices is too high or the cycloolefin copolymer employed has too high a crystallinity, i.e. is no longer transparent, the fiber-reinforced cycloolefin copolymer material is also not transparent. However, transparency is not important for many intended uses. The material according to the invention is usually further processed in the form of granules. Material reinforced with long fibers can be used for wrapping pipes.

The cycloolefin copolymers (="COC") according to EP 503 422 are partly crystalline and therefore have a melting point. The melt can be processed at about 10–20 K. above the melting point, i.e. at about 295°–310° C. The fiber material can be incorporated, for example, into the melt.

On the other hand, amorphous COC have only a glass transition temperature and cannot be processed until about 170 K. above the glass transition temperature (at about 350° C.).

The COC according to EP 503 422 are transparent up to a partial crystallinity of 20%. They become less and less transparent at a partial crystallinity of 20–40%. The degree of crystallinity can be reduced by quenching from the melt. The use of symmetric monomer molecules, the reduction in the number of monomers and approaching an equimolar molar ratio during synthesis of COC increases the tendency toward crystallization. A COC which is derived from methyl-norbornene as the polycyclic olefin will have a lower tendency toward crystallization than an analogous COC derived from norbornene.

The COC which can be prepared by the process according to EP 503 422 are practically free from blocks which comprise monomers of the formulae I to VI ("norbornene blocks"). In general, a polycyclic monomer of the formulae I to VI is followed by at least one monomer of the formulae VII and/or VIII.

It is surprising that when reinforcing fibers, in particular glass fibers, are incorporated into the COC according to EP 503 422, the ductility (for example the elongation at break) increases at temperatures above the glass transition temperature. This effect is otherwise known only for partly crystalline polymers having a degree of crystallinity of at least 20%, while in the "chemically uniform" COC, it already occurs at significantly lower degrees of crystallinity (at least from 5%). The fiber-reinforced materials according to the invention are superior to the fiber-reinforced materials according to EP 451 858 which comprise an amorphous COC. This manifests itself in the higher heat distortion point and in the improved thermoplastic processability of the COC according to EP 503422.

The surprising fact that chemically uniform cycloolefin copolymers can be reinforced particularly well with glass fibers is possibly because they display a very low shrinkage after processing and the glass fiber is thus not detached from the polymer matrix. This leads to a better geometric adhesion.

The shrinkage is stated as the so-called processing rate, which is determined in accordance with DIN 53464. The processing rate of chemically uniformcycloolefin copolymers is less than 0.4%.

A significant improvement in the mechanical properties of filled and non-filled chemically uniform cycloolefin copolymers can be achieved by after-treatment with heat and/or by the use of a suitable nucleating agent.

The content of reinforcing fibers, in particular glass fibers, in the material according to the invention is preferably 10 to 90% by weight, in particular 50 to 75% by weight.

To prepare a fiber-reinforced cycloolefin copolymer material according to the invention, the melt of a chemically uniformcycloolefin copolymer defined above in more detail is mixed with the desired content of reinforcing fibers.

The glass fibers used usually have sizes which protect the glass filaments from mechanical load and bond strands of glass loosely to one another.

The main constituents of sizes are, according to WO 86/01811, film-forming polymers and lubricants and, if required, adhesion promoters and other additives. The film-forming polymers are dispersible, soluble or emulsifiable in an aqueous medium, as is the reaction product with process auxiliaries. The content of water in the aqueous chemical combination of the size constituents is designed such that these result in the effective content of solid on the glass fiber.

The aqueous chemical combination for the treatment of glass fibers can be employed in any method for the preparation of cut glass fibers or continuous glass fibers. For example, it can be used in the wet cutting operation in which the fibers are combined in bundles and cut directly during the formation process, or the chemically treated glass fibers are combined in bundles or strands and wound up and only subsequently cut.

In the case of the glass fiber-reinforced plastic materials which belong to the prior art, the problem occurs that the (polar) glass fibers sometimes adhere poorly to non-polar polymers and therefore the mechanical resistance of the shaped articles is not optimum. Adhesion promoters have therefore already been employed in this connection for better coupling. These adhesion promoters are applied to the glass fiber either during treatment with the aqueous chemical combination of the size constituents or by a separate treatment with a solution of the adhesion promoter.

It is furthermore possible to introduce the adhesion promoters into the melt of the polymer. This method has the advantage that no solutions have to be processed. The adhesion promoters can also advantageously be incorporated into the composite by preparing masterbatches which utilize the dilution principle, as is possible with the other additives.

This addition of adhesion promoters is also advantageous in the process according to the invention for the preparation of glass fiber-reinforced chemically uniform cycloolefin copolymers. According to the invention, it is possible either to add a polymer melt adhesion promoter or to coat the glass fibers with an adhesion promoter.

Known adhesion promoters can be chosen from the group comprising vinylsilanes, methacrylylsilanes, aminosilanes, epoxysilanes and methacrylate-chromium chloride complexes.

Polymer-based organic adhesion promoters are preferred, the organic adhesion promoters which are functionalized cycloolefin copolymers being particularly preferred. A functionalized, "chemically uniform" cycloolefin copolymer is advantageously employed here as the adhesion promoter.

The functionalized "chemically uniform" cycloolefin copolymer is preferably prepared by grafting a chemically uniform cycloolefin copolymer with a polar monomer. It is particularly advantageous if the polar monomer used for the grafting is chosen from the group comprising alpha,beta-unsaturated carboxylic acids, alpha,beta-unsaturated carboxylic acid derivatives, organic silicon compounds having an olefinically unsaturated and hydrolyzable group, olefinically unsaturated compounds having the hydroxyl group and olefinically unsaturated epoxy monomers. Similar grafted polymers, which needless to say are not derived from "chemically uniform" cycloolefin copolymers, are already known.

The invention thus relates to an adhesion promoter which is prepared by grafting a "chemically uniform" cycloolefin copolymer, described above with a polar monomer. The content of grafted polar monomer in the polymer is 0.01 to 50% by weight. No particular requirements are placed on the glass used. The glass fibers are preferably made of magnesium alumosilicate having a refractive index of 1.50 to 1.56 and comprise 60 to 68% by weight of $SiO_2$, 23 to 29% by weight of $Al_2O_3$ and 8 to 12% by weight of MgO. The fiber material to be incorporated usually has an average fiber length of 0.0001–7 mm, in particular 0.1 to 2 mm.

The invention is illustrated in more detail by the examples.

EXAMPLES

Example 1

A 70 l reactor was filled with ethylene, and 17.6 of an 85 percent strength by weight solution of norbornene in toluene and 12.4 l of decalin were introduced. The solution was saturated with ethylene by forcing in ethylene (6 bar) several times. A pressure of 3.0 bar (increased pressure) was established, 950 $cm^3$ of a toluene solution of methylaluminoxane (10.1% by weight of methylaluminoxane of molecular weight 1300 g/mol according to cryoscopic determination) were introduced into the reactor and the mixture was stirred at 70° C. for 15 minutes. A solution of 157 mg of isopropylene(9-fluorenyl)(1-(3-methyl)cyclopentadienyl)zirconium dichloride in 80 cm³ of a toluene solution of methylaluminoxane was added after preactivation for 15 minutes (hydrogen can be metered in before the addition of the catalyst in order to regulate the molecular weight). Polymerization was carried out at 70° C. for 30 minutes, while stirring (750 revolutions per minute), the ethylene pressure being kept at 3.0 bar by topping up. The reaction solution was then introduced into a second reactor into which 200 ml of isopropanol had initially been introduced as a stopping agent. The reaction solution stopped in this way was drained into a precipitation reactor and stirred here into 200 l of acetone. This precipitation bath was then passed over a pressure suction filter so that the solid which had precipitated could be isolated. This solid was washed with acetone several more times and then dried at 80° C. under a pressure of 0.2 bar for 14 hours.

1.89 kg of a colorless polymer were obtained. A viscosity number (decalin, 135° C.) of 75 cm³/g, a glass transition temperature of 137° C. and a melting point of 287° C. were measured. According to the NMR spectrum, the norbornene/ethylene incorporation ratio is about 50 mol % of norbornene to 50 mol % of ethylene. This cycloolefin copolymer is called COC A1 below.

Example 2

A 70 l reactor was filled with ethylene, and 17.6 l of an 85 percent strength by weight solution of norbornene in toluene and 12.4 l of decalin were introduced. The solution was saturated with ethylene by forcing in ethylene (6 bar) several times. A pressure of 6.0 bar (increased pressure) was established, 950 cm³ of a toluene solution of methylaluminoxane (10.1% by weight of methylaluminoxane of molecular weight 1300 g/mol according to cryoscopic determination) were introduced into the reactor and the mixture was stirred at 70° C. for 15 minutes. A solution of 75 mg of diphenylmethylene(9-fluorenyl)cyclopentadienylzirconium dichloride in 40 cm³ of a toluene solution of methylaluminoxane was added after preactivation for 15 minutes (hydrogen can be metered in before addition of the catalyst in order to regulate the molecular weight). Polymerization was carried out at 70° C. for 30 minutes, while stirring (750 revolutions per minute), the ethylene pressure being kept at 6.0 bar by topping up. The reaction solution was then introduced into a second reactor into which 200 ml of isopropanol had initially been introduced as a stopping agent. The reaction solution stopped in this way was drained into a precipitation reactor and stirred here into 200 l of acetone. This precipitation bath was then passed over a pressure suction filter so that the solid which had precipitated could be isolated. This solid was washed with acetone several more times and then dried at 80° C. under a pressure of 0.2 bar for 14 hours.

7.8 kg of polymer which has a glass transition temperature of 181° C. and a viscosity number (measured in decalin at 135° C.) of 108 were obtained. The polymer is composed of 46% by weight of ethylene and 54% by weight of norbornene, which are randomly distributed in the polymer.

This polymer is called COC A2 below.

Example 3

Filling the polymers with glass fibers and granulation

COC A1 was extruded together with 30 percent by weight of glass fibers in an extruder and processed to granules. The extrusion temperature was between 260° and 300° C. (different temperatures in different heating zones of the extruder). A vacuum of 100 mbar was applied for devolatilization of the polymer melt. The glass fibers used were textile glass roving P 365 (commercial product from VETROTEX; Herzogenrath, Federal Republic of Germany). The nominal filament diameter (DIN 53811) of the glass fibers is 14 μm, the roving fineness (DIN 53830) is 2400 tex and the strand fineness (DIN 53830) is 300 tex. Colorless granules of COC A1 filled with 30 percent by weight of glass fibers were obtained.

To prepare COC A2 granules filled with 30% by weight of glass fibers, the extrusion temperature had to be increased to 310° to 350° C. The other conditions correspond to the extrusion conditions mentioned above for glass fiber-filled COC A1. Since 350° C. is already the upper processing temperature for COC, damage to the polymer already occurred during this granulation and revealed itself in a significant yellow coloration of the granules.

The processability of thermoplastic polymers is characterized by the MFI. The higher the MFI (DIN 53735) at the processing temperature, the lower the viscosity of the polymer melt and the better the material can be processed by extrusion and injection molding. The MFI was therefore determined on the resulting granules. The value found is shown in Table 1 together with comparison values for other glass fiber-filled cycloolefin copolymers.

TABLE 1

| | MFI of COC A1 and COC A2 each filled with 30% by weight of glass fibers |
|---|---|
| | MFI (g/10 minutes) 310° C.; 10 kg |
| COC A1 | 284 |
| COC A2 | 73 |

The data presented clearly show that glass fiber-filled compositions of COC A1 have a superior thermoplastic processability.

Example 4

Standard test specimens were produced by injection molding from the granules prepared under Example 2. The HDT-B of these standard test specimens was determined in accordance with DIN 53461. The values determined are summarized in Table 2.

TABLE 2

| | HDT-B of COC-A1 and COC-A2 each filled with 30% by weight of glass fibers |
|---|---|
| | HDT-B/°C. |
| COC A1 | 244 |
| COC A2 | 177 |

These values demonstrate that the chemically uniform cycloolefin copolymer filled with glass fibers has a significantly higher heat distortion point than the corresponding composites based on cycloolefin copolymers COC A2.

Example 5

Standard test specimens were produced by injection molding from glass fiber-reinforced COC A1 and COC A2 (in each case 30% of glass fibers) and from non-filled COC A1. The mechanical properties were determined on these by tensile stress tests. The determination of the mechanical properties was carried out at room temperature and at 210° C. The corresponding values are shown in Table 3, 4, 5, and 6.

TABLE 3

Mechanical properties of COC A1 with and without glass fibers at 23° C.

| | E modulus in MPa | Tensile stress at break in MPa | Elongation at break in % |
|---|---|---|---|
| COC A1 without glass fibers | 3971 | 43.7 | 1.8 |
| COC A1 with 30% by weight of glass fibers | 10230 | 83.5 | 1.8 |

TABLE 4

Mechanical properties of COC A1 with and without glass fibers at 210° C.

| | E modulus in MPa | Tensile stress at break in MPa | Elongation at break in % |
|---|---|---|---|
| COC A1 without glass fibers | 35 | 3.9 | 55.6 |
| COC A1 with 30% by weight of glass fibers | 463 | 1.9 | 17.3 |

The values shown in Tables 3 and 4 show that by introduction of glass fibers into chemically uniform polymers, a significant improvement in the mechanical properties of the polymer is achieved. The superior rigidity of the glass fiber-filled COC A1 at 210° C. is particularly clear.

TABLE 5

Mechanical properties of COC A1 and COC A2, filled with 30% by weight of glass fibers, at 23° C.

| | E modulus in MPa | Tensile stress at break in MPa | Elongation at break in % |
|---|---|---|---|
| COC A1 | 10,230 | 83.5 | 1.8 |
| COC A2 | 8320 | 75.1 | 1.6 |

TABLE 6

Mechanical properties of COC A1 and COC A2, filled with 30% by weight of glass fibers, at 210° C.

| | E modulus in MPa | Tensile stress at break in MPa | Elongation at break in % |
|---|---|---|---|
| COC A1 | 463 | 1.9 | 17.3 |
| COC A2 | no longer measurable | | |

The values summarized in Table 5 and 6 show that the mechanical properties of a chemically uniform cycloolefin copolymer filled with glass fibers are significantly superior to those of a random cycloolefin copolymer filled with glass fibers.

Examples 1 to 5 demonstrate that only with glass fiber-reinforced chemically uniform cycloolefin copolymers is it possible to realize a heat distortion point (HDT-B) of greater than 180° C., good mechanical properties, such as high rigidity, and at the same time a good processability.

The tear strength, i.e. the tensile stress at which the standard tensile specimen breaks, and the elongation at break, i.e. the maximum elongation, were determined in accordance with DIN 53455 with the aid of an ®Instron tensile tester (Instron, Offenbach, Federal Republic of Germany). The E modulus (elasticity) is calculated from the tensile stress-elongation curve in accordance with DIN 53457. The heat distortion point HDT-B was determined in accordance with DIN 53461. The MFI was determined in accordance with DIN 53735. The viscosity number was determined in accordance with DIN 53726.

The granules were prepared with the aid of a Leistritz LSM 30.34 laboratory extruder (Leistritz; Nuremberg, Federal Republic of Germany).

The standard test specimens were produced by injection molding using a Krauss Maffei KM 90-210 B injection molding machine (Krauss Maffei, Kunststofftechnik GmbH; Düsseldorf; Federal Republic of Germany).

We claim:

1. A fiber-reinforced cycloolefin polymer material comprising 1 to 99% by weight of reinforcing fibers and 99 to 1% by weight of a cycloolefin copolymer which is built up from at least one polycycloolefin of the formulae I to VI

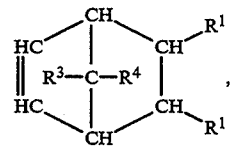

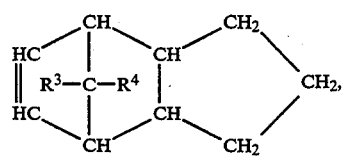

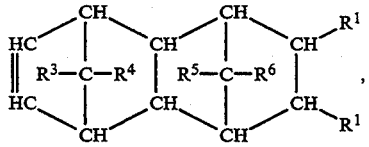

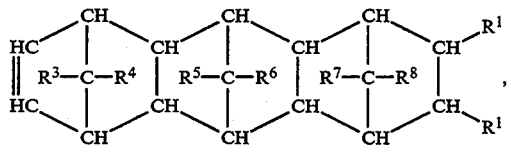

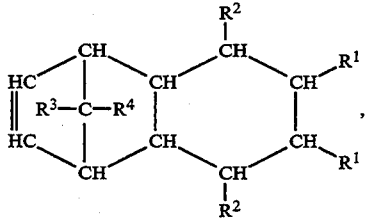

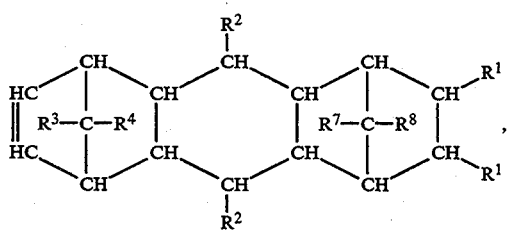

in which $R^1$, $R^2$, $R^3$, $R^4$, $R^5$, $R^6$, $R^7$ and $R^8$ are identical or different and are a hydrogen atom or a $C_6$–$C_{16}$-aryl or a $C_1$–$C_8$-alkyl radical, and at least one olefin which is chosen from monocycloolefins of the formula VII

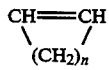 (VII)

in which n is a number from 2 to 10, and/or the group of acyclic olefins VIII

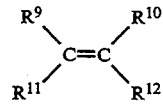 (VIII)

in which $R^9$, $R^{10}$, $R^{11}$ and $R^{12}$ are identical or different and are a hydrogen atom or a $C_1$–$C_8$-alkyl radical, in which, in the cycloolefin copolymer molecule, the monomer units of the polycycloolefin of the formulae I to VI are in each case separated by monomer units of the cyclic olefins VII and/or of the acyclic olefins of the formula VIII.

2. A material as claimed in claim 1, in which a single polycycloolefin of the formulae I to VI and either at least one monocyclic olefin of the formula VII or at least one acyclic olefin of the formula VIII are present in the polymer molecule.

3. A material as claimed in claim 1, in which norbornene or tetracyclododecene, as the polycycloolefin, and a 1-olefin, as the acyclic olefin, are present in the polymer molecule.

4. A material as claimed in claim 3, in which norbornene or tetracyclododecene and ethylene are present and erranged regularly in the polymer molecule.

5. A material as claimed in claim 1, in which the cycloolefin polymer material is prepared by polymerization of 0.1 to 99.9% by weight, based on the total amount of monomers, of at least one monomer of the formula I, II, III, IV, V or VI

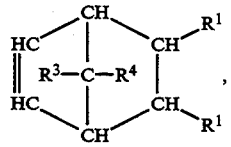 (I)

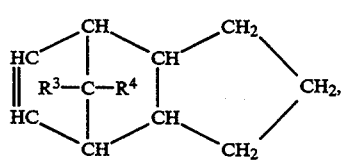 (II)

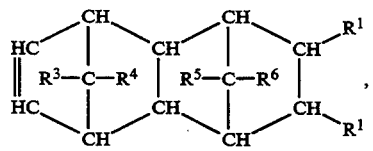 (III)

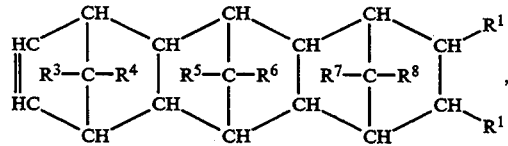 (IV)

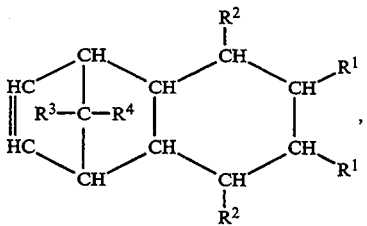 (V)

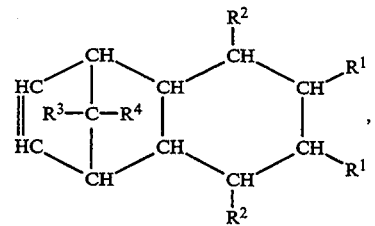 (VI)

in which $R^1$, $R^2$, $R^3$, $R^4$, $R^5$, $R^6$, $R^7$ and $R^8$ are identical or different and are a hydrogen atom or a $C_6$–$C_{16}$-aryl or a $C_1$–$C_8$-alkyl radical, it being possible for the same radicals in the various formulae to have a different meaning, 0 to 99.9% by weight, based on the total amount of monomers, of a cycloolefin of the formula VII

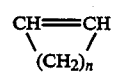 (VII)

in which n is a number from 2 to 10, and 0 to 99.9% by weight, based on the total amount of monomers, of at least one acyclic olefin of the formula VIII

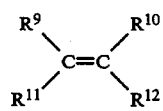 (VIII)

in which $R^9$, $R^{10}$, $R^{11}$ and $R^{12}$ are identical or different and are a hydrogen atom or a $C_1$–$C_8$-alkyl radical, at temperatures of $-78°$ to $150°$ C. under a pressure of 0.01 to 64 bar in the presence of a catalyst which comprises an aluminoxane of the formula IX

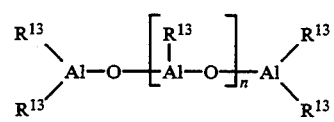 (IX)

for the linear structure and/or of the formula X

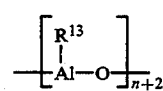 (X)

for the cyclic structure, in which in the formulae IX and X the radicals $R^{13}$ are identical or different and are a $C_1$–$C_6$-alkyl group or phenyl or benzyl and n is an integer from 0 to 50, and a metallocene of the formula XI

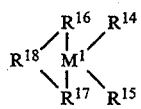 (XI)

in which $M^1$ is titanium, zirconium, hafnium, vanadium, niobium or tantalum, $R^{14}$ and $R^{15}$ are identical or different and are a hydrogen atom, a halogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group or a $C_8$–$C_{40}$-arylalkenyl group, $R^{16}$ and $R^{17}$ are identical or different and are a mono- or polynuclear hydrocarbon radical which can form a sandwich structure with the central atom $M^1$,

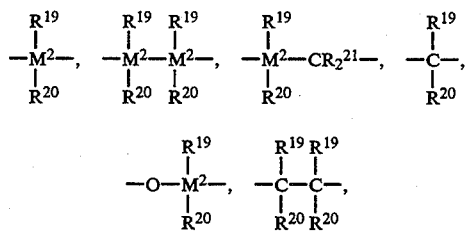

$=BR^{19}$, $=AlR^{19}$, $—Ge—$, $—Sn—$, $—O—$, $—S—$, $=SO$, $=SO_2$, $=NR^{19}$, $=CO$, $=PR^{19}$ or $=P(O)R^{19}$, in which $R^{19}$, $R^{20}$ and $R^{21}$ are identical or different and are a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group, or $R^{19}$ and $R^{20}$ or $R^{19}$ and $R^{21}$, in each case with the atoms joining them, form a ring, and $M^2$ is silicon, germanium or tin, wherein the part of the metallocene molecule formed by $M^1$ and the substituents $R^{16}$–$R^{17}$ displays $C_1$-symmetry or, if $R^{16}$ and $R^{17}$ are identical, is in the meso-form.

6. A material as claimed in claim 1, in which the reinforceing fibers comprise glass fibers.

7. A material as claimed in claim 1, in which the reinforcing fibers are of carbon, metal, ceramic or aramid.

8. A material as claimed in claim 1, in which the cycloolefin copolymer employed is transparent.

9. A material as claimed in claim 1, in which the cycloolefin copolymer employed is not transparent.

10. A material as claimed in claim 6, in which the content of glass fibers is 10 to 90% by weight and the content of cycloolefin copolymers is 90 to 10% by weight.

11. A shaped article from a material as claimed in claim 1.

12. A process for the preparation of a fiber-reinforced cycloolefin polymer material in which a melt of the cycloolefin copolymer is mixed with reinforcing fibers, a content of 1 to 99% by weight of reinforcing fibers being established, which comprises using the cycloolefin copolymer of at least one polycycloolefin of the formulae I to VI and at least one olefin chosen from the group of monocycloolefins of the formula VII and/or the group of acyclic olefins of the formula VIII, the monomer units of the polycycloolefin of the formulae I to VI employed in each case being separated by monomer units of the monocyclic olefin VII and/or of the acyclic olefins VIII in the polymer molecule.

13. The process as claimed in claim 12, wherein glass fibers having a refractive index of 1.50 to 1.56 are used as the reinforcing fibers.

14. The process as claimed in claim 13, wherein the glass fibers are coated with an adhesion promoter and then combined with the melt of the cycloolefin copolymer.

15. The process as claimed in claim 14, wherein an adhesion promoter is added to the melt of the cycloolefin copolymer.

16. The process as claimed in claim 15, wherein a functionalized cycloolefin copolymer is employed as the adhesion promoter.

* * * * *